US011514691B2

(12) United States Patent
Perera et al.

(10) Patent No.: US 11,514,691 B2
(45) Date of Patent: Nov. 29, 2022

(54) GENERATING TRAINING SETS TO TRAIN MACHINE LEARNING MODELS

(71) Applicant: International Business Machines Corporation, Armonk, NY (US)

(72) Inventors: Pathirage D. S. U. Perera, San Jose, CA (US); Eitan D. Farchi, Pardes Hana (IL); Orna Raz, Haifa (IL); Ramani Routray, San Jose, CA (US); Sheng Hua Bao, San Jose, CA (US); Marcel Zalmanovici, Kiriat Motzkin (IL)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 16/438,837

(22) Filed: Jun. 12, 2019

(65) Prior Publication Data

US 2020/0394461 A1 Dec. 17, 2020

(51) Int. Cl.
*G06V 30/19* (2022.01)
*G06K 9/62* (2022.01)
(Continued)

(52) U.S. Cl.
CPC ........ *G06V 30/19147* (2022.01); *G06F 16/93* (2019.01); *G06K 9/6221* (2013.01);
(Continued)

(58) Field of Classification Search
CPC ........ G06N 3/084; G06N 3/082; G06N 20/00; G06N 20/10; G06F 17/18; G06F 16/93;
(Continued)

(56) References Cited

U.S. PATENT DOCUMENTS 8,781,989 B2 7/2014 Duchon
2012/0030157 A1* 2/2012 Tsuchida ............... G06N 20/00
706/20
(Continued)

OTHER PUBLICATIONS

Xu et al, "Representative Sampling for Text Classification Using Support Vector Machines" (published in 25th European Conference on Information Retrieval Research, ECIR 2003, vol. 2633, pp. 393-407, Jan. 2003).*

(Continued)

*Primary Examiner* — Casey L Kretzer
(74) *Attorney, Agent, or Firm* — Edell, Shapiro & Finnan, LLC

(57) ABSTRACT

A computer system trains a machine learning model. A vector representation is generated for each document in a collection of documents. The documents are clustered based on the vector representations of the documents to produce a plurality of clusters. A training set is produced by selecting one or more documents from each cluster, wherein the selected documents represent a sample of the collection of documents to train the machine learning model. The machine learning model is trained by applying the training set to the machine learning model. Embodiments of the present invention further include a method and program product for training a machine learning model in substantially the same manner described above.

18 Claims, 6 Drawing Sheets

(51) Int. Cl.
   *G06N 20/00* (2019.01)
   *G06F 16/93* (2019.01)
(52) U.S. Cl.
   CPC ......... *G06K 9/6257* (2013.01); *G06K 9/6272* (2013.01); *G06N 20/00* (2019.01)
(58) Field of Classification Search
   CPC .. G06K 9/6228; G06K 9/6249; G06K 9/6277; G06K 9/628; G06K 9/6221; G06K 9/6257; G06K 9/6272; G06V 10/751; G06V 30/19147
   See application file for complete search history.

(56) References Cited

U.S. PATENT DOCUMENTS

| | | |
   |---|---|---|
   | 2016/0203523 A1 | 7/2016 | Spasojevic et al. |
   | 2017/0206466 A1 | 7/2017 | Zoldi et al. |
   | 2018/0232380 A1* | 8/2018 | English ............... G06F 16/3344 |

OTHER PUBLICATIONS

Disclosed Anonymously, "Incremental sharing using machine learning", IPCOM000252683D, Feb. 1, 2018, 33 pages.

Disclosed Anonymously, "Determining High-Level Topical Annotations for a Conversation", IPCOM000252291D, Jan. 3, 2018, 34 pages.

Disclosed Anonymously, "Machine Learning to Predict Advertisement Targeting Solutions", IPCOM000252091D, Dec. 15, 2017, 35 pages.

Disclosed Anonymously, "Semi-Supervised Classification Using Object Metadata", IPCOM00025345D, Jan. 5, 2018, 34 pages.

Li, Xue, "Opinion Search Engine", Australian Computer Society, Inc., 2016, 4 pages.

Rong, et al., "LAMVI-2: A Visual Tool for Comparing and Tuning Word Embedding Models", arXiv:1810.11367v1 [cs.CL], Oct. 29, 2018, 20 pages.

* cited by examiner

GENERATING TRAINING SETS TO TRAIN MACHINE LEARNING MODELS

BACKGROUND

1. Technical Field

Present invention embodiments relate to machine learning, and more specifically, to generating training sets to train machine learning models.

2. Discussion of the Related Art

Supervised learning refers to the task of teaching a machine learning model to map an input to an output using examples found in labeled training data. A label may indicate meaningful information about a sample of data. For example, an image may be labeled to indicate whether the image contains a horse or a cow. Since labeling often requires human effort and expertise, it may be time-consuming and expensive to generate sufficiently large volumes of labeled training data required for supervised learning projects.

SUMMARY

According to one embodiment of the present invention, a computer system trains a machine learning model. A vector representation is generated for each document in a collection of documents. The documents are clustered based on the vector representations of the documents to produce a plurality of clusters. A training set is produced by selecting one or more documents from each cluster, wherein the selected documents represent a sample of the collection of documents to train the machine learning model. The machine learning model is trained by applying the training set to the machine learning model. Embodiments of the present invention further include a method and program product for training a machine learning model in substantially the same manner described above.

BRIEF DESCRIPTION OF THE DRAWINGS

Generally, like reference numerals in the various figures are utilized to designate like components.

DETAILED DESCRIPTION

Figure 1:
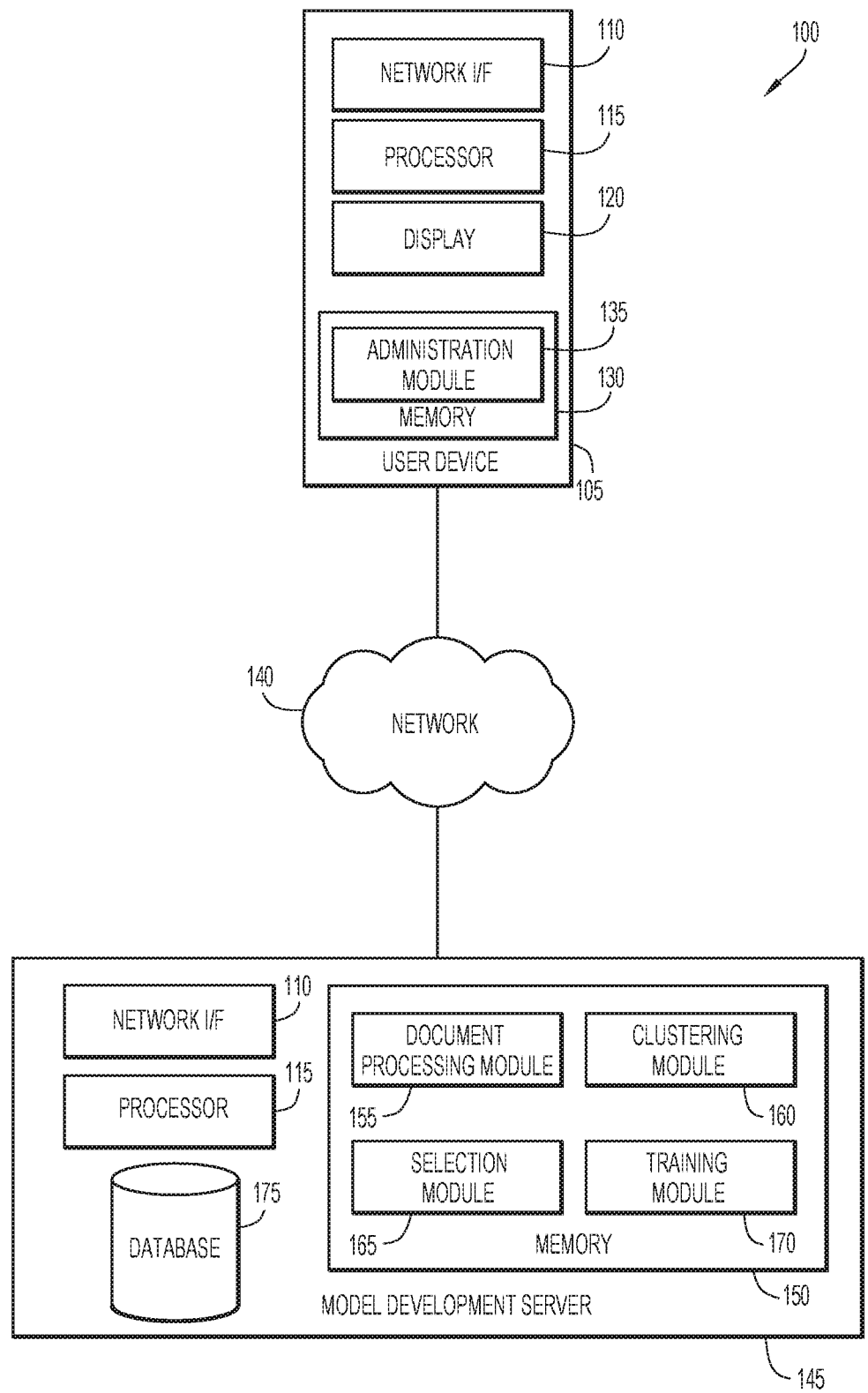
FIG. 1 is a block diagram depicting a computing environment for training a machine learning model in accordance with an embodiment of the present invention.

Present invention embodiments relate to machine learning, and more specifically, to generating training sets to train machine learning models. Supervised machine learning techniques may require training data that is labeled. For example, a machine learning model that performs object recognition may be trained using a set of images of objects in which each image has been labeled with one or more descriptors of the object that the image depicts. Since training sets may require manual labeling, the generation of large, accurately-labeled training sets can be prohibitively expensive and time-consuming. In order to reduce the costs associated with labeling training data, conventional approaches may sample available data and only label the sampled data. However, labeling only the sampled data may produce unsatisfactory results, as the data that was sampled may not be representative, in terms of statistics and semantics, of the entire data in the context of the given learning task and goal. For example, in a dataset having 500 possible labels, a training set should have selected samples that represent each of the 500 labels. The samples that are selected to be labeled should represent the semantic diversity of the data within a label. Further, known approaches often require that an initial set of labeled examples already exists in order to perform sampling.

Present invention embodiments select semantically representative samples from datasets in the context of a learning task and goal. In particular, the sampling techniques of present embodiments may focus on the semantics of the data, and can be applied even when no initial labels exist. Topic-based data sampling is performed by processing documents to produce vectors that are clustered according to topic. Samples may be selected from clusters in a manner that improves the semantic diversity of the sampled documents. Thus, present invention embodiments produce training sets of data that are semantically diverse, and since manual intervention is not required, useful training sets may be produced more quickly and inexpensively than conventional approaches. Moreover, topics may be generated based on the clustering, thereby enabling the generation of training sets without requiring previously-labeled examples.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for training a machine learning model in accordance with an embodiment of the present invention. As depicted, computing environment 100 includes a user device 105, a network 140, and a model development server 145. It is to be understood that the functional division among components of computing environment 100 have been chosen for purposes of explaining present invention embodiments and is not to be construed as a limiting example.

User device 105 includes a network interface 110, at least one processor 115, a display 120, and memory 130. Memory 130 may include administration module 130. User device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 110 enables components of user device 105 to send and receive data over a network, such as network 140. User device 105 may include internal and external hardware components, as depicted and described in further detail with respect to FIG. 4.

Display 120 may include any electronic device capable of presenting information in a visual form. For example, display 120 may be a liquid crystal display (LCD), a cathode ray tube (CRT) display, a light-emitting diode (LED) display, an electronic ink display, and the like. Information relating to the generation of training sets and the training of machine learning models may be displayed to a user of user device 105 via display 120.

Administration module 135 may include one or more modules or units to perform various functions of present invention embodiments described below. Administration module 135 may be implemented by any combination of any quantity of software and/or hardware modules or units, and may reside within memory 130 of user device 105 for execution by a processor, such as processor 115.

Administration module 135 may enable a user of user device 105 to manage the generation of training sets and the training of machine learning models that is performed by model development server 145. For example, a user of user device 105 may provide instructions, via administration module 135, for model development server 145 and its models to generate a labeled training set based on provided data, such as a corpus of documents. Similarly, a user may provide input to administration module 135 in order to instruct model development server 150 to train a machine learning model using a training set and/or to apply a machine learning model to one or more tasks. A user may interact with administration module 135 to specify options for generating a training set, such as the size of the training set, the number of iterations to be performed, and options for selecting representative samples for topics (e.g., whether to select a sample nearest a centroid of a cluster, to randomly select a sample from a cluster, etc.).

Network 140 may include a local area network (LAN), a wide area network (WAN) such as the Internet, or a combination of the two, and includes wired, wireless, or fiber optic connections. In general, network 140 can be any combination of connections and protocols known in the art that will support communications between user device 105 and model development server 145 via their respective network interfaces 110 in accordance with embodiments of the present invention.

Model development server 145 includes a network interface 110, at least one processor 115, memory 150, and a database 175. Memory 150 includes a document processing module 155, a clustering module 160, a selection module 165, and a training module 170. In various embodiments of the present invention, server 145 may include a laptop computer, a tablet computer, a netbook computer, a personal computer (PC), a desktop computer, a personal digital assistant (PDA), a smart phone, or any programmable electronic device capable of executing computer readable program instructions. Network interface 110 enables components of model development server 145 to send and receive data over a network, such as network 140. In general, model development server 145 and its modules may generate labeled training sets to train machine learning models. Model development server 145 may include internal and external hardware components, as depicted and described in further detail with respect to FIG. 4.

Document processing module 155, clustering module 160, selection module 165, and training module 170 may include one or more modules or units to perform various functions of present invention embodiments described below. Document processing module 155, clustering module 160, selection module 165, and training module 170 may be implemented by any combination of any quantity of software and/or hardware modules or units, and may reside within memory 150 of model development server 145 for execution by a processor, such as processor 115.

Document processing module 155 may process documents in a sample corpus to generate vector representations that are each based on a document. Each document may include a sample of text in which one or more topics are discussed. Documents may discuss any subject matter and may be any length. Document processing module 155 may receive documents from database 175 of model development server 145.

Document processing module 155 may generate a vector representation for each document that presents a probability distribution of the document discussing particular topics. Each vector includes a series of numbers, each of which represents a likelihood of the document discussing a topic. Thus, document processing module 155 may output a vector of probabilities per topic. For example, if a collection of documents is known to encompass three possible topics, a vector representation for each document may include three values, with the first value indicating the probability of that document discussing a first topic, the second value indicating the probability of that document discussing a second topic, and the third value indicating the probability of that document discussing a third topic. In some embodiments, each value for a topic is a number between zero and one, with values that are closer to one indicating a greater likelihood that a document relates to that topic. Vector representations may be n-dimensional, with n being defined according to a number of topics. Topics may be determined based on domain understanding for a particular learning task and goal.

Document processing module 155 may generate vector representations for documents using a latent Dirichlet allocation model. A latent Dirichlet allocation model is a generative model that employs a density function to quantify the degree of certainty of a document pertaining to a particular topic. The density function may utilize the Dirichlet distribution, $Dir(\alpha)$, as a probability function in quantifying probabilities of documents relating to topics. The latent Dirichlet allocation model may determine a probability that a document relates to a particular topic based on an assumption that each document is a mixture of a small number of topics, and that the presence of particular words in a document can be attributable to one or more of the document's topics. For example, a topic that may be classified as "cow-related" may have probabilities of including certain words, such as "milk," "dairy," "moo," and the like. Some words, such as "cow" may have a higher probability of relating to the topic of "cow-related," while other words, such as "ungulate" may be lower. Words without special relevance, such as "the" or "and," may receive similar probabilities across topics. Document processing module 155 may utilize dictionaries containing keywords (including alternative words and/or synonyms) for each topic, which the latent Dirichlet allocation model utilizes to calculate probabilities of documents pertaining to each topic. In some embodiments, the vector representation for a document indicates the frequency of a document's terms appearing in a dictionary for a selected topic. For example, a document may be processed against one or more dictionaries to produce a vector representation that contains a Boolean value of the terms of the one or more dictionaries. In some embodiments, a values of a vector may be a count of a dictionary term's appearance in the document, and the count may be a cumulative sum or a normalized value.

Clustering module 160 may identify clusters of vector representations that are output by document processing module 155. Vector representations may be represented in an n-dimensional space, with n being defined according to a number of topics (and therefore clusters). For example, if a set of documents is representative of three topics, then each document's vector representation has three dimensions, and the values of the three components of a given document's vector may indicate the document's probability of discussing each of the three topics. Thus, if a document's vector representation is described as a triple of scalar components, such as (0.1, 0.5, 0.8), then the document may have a probability of 0.1 (e.g., a low likelihood) of discussing a first topic, a probability of 0.5 (e.g., an intermediate likelihood) of discussing a second topic, and a probability of 0.8 (e.g. a high likelihood) of discussing a third topic. In some embodiments, topics are identified by applying a density function of the latent Dirichlet allocation model to identify clusters of documents, which are then associated with a particular topic.

Clustering module 160 may employ known or other clustering algorithms to cluster the vector representations. In some embodiments, k-means clustering is applied to identify clusters of vectors. Clustering module 160 may utilize domain understanding of a particular learning task or goal to determine the number of clusters that should be identified. Each identified cluster may correspond to one label for a training set. In some embodiments, a cluster that is identified by clustering module 160 may not necessarily contain documents whose vector representations are closely-clustered to each other, but rather, the vector representations may instead by farther from vector representations that belong to other clusters. For example, vectors A and B may be assigned to cluster M not because vectors A and B are close to each other, but because vectors A and B are far from vector C, which is assigned to cluster N. Thus, when one vector is selected from each cluster, the selected vectors may be all be far from each other, resulting in a semantically diverse sample. Presented embodiments therefore perform clustering in a manner that ensures that documents relating to different topics are represented as desired in a learning data set.

Selection module 165 may select documents for a training set based on the vector representations of the documents and the identified clusters. Selection module 165 may select a document from each cluster according to selection criteria. In particular, selection module 165 may identify a centroid for each cluster, and select a document based the distance of the document's vector representation to the centroid of the cluster to which it belongs. Selection module 165 may select a document that is closest to its cluster's centroid or farthest from its cluster's centroid. In some embodiments, selection module 165 may randomly select a document from each cluster. In some embodiments, selection module 165 orders documents of a topic based on the distance of each document's vector representation to the topic, which may be defined as a centroid of a cluster or a predetermined point that is based on provided scalar values. A position vector may then be generated for each document based on the position of the document in the order for a topic (e.g., distance of a document to a topic), and documents may then be selected based on the ordering of position vectors.

Documents that are selected by selection module 165 may be assigned to a training set of documents that can be used to train a machine learning model. Selection module 165 may select documents by performing one or more iterations until the training set reaches a desired size. In each iteration, selection module 165 may select one document per cluster. The size of a training set may be based on input by a user and/or may be predetermined according to a particular machine learning task and goal. For example, if the vector representations for a sample of documents are grouped into twenty clusters, and a training set of one hundred documents is desired, then selection module 165 may perform five iterations, selecting one document from each of the twenty clusters in each iteration. Once a document is selected, the document may be excluded from consideration in a next iteration. In each iteration, one or more selection criteria may be applied; for example, in one iteration, a document may be randomly selected from each cluster, in a next iteration, a document closest to the centroid of the document's cluster may be selected, and in a next iteration, a document farthest from the centroid of the document's cluster may be selected. Additionally or alternatively, selection criteria may be varied in an iteration, with one selection criterion being applied to select a document from a first cluster, another selection criterion being used to select a document from a second cluster, and the like. The selection criterion that is applied may be determined randomly from one cluster to another and/or from one iteration to the next. In some embodiments, a user may provide instructions regarding the choice of selection criteria.

Training module 170 may train machine learning models using training sets of labeled documents. Training module 170 may employ known or other training techniques, including supervised machine learning techniques, to train a machine learning model to map inputs to outputs based on examples found in the training set. Each training set may include documents that are selected and labeled by selection module 165. Each document may receive a label of a topic that corresponds to the cluster from which the document was selected. Thus, training module 170 may train a machine learning model based on the relationships between labels and contents of documents in a training set.

Database 175 may include any non-volatile storage media known in the art. For example, database 175 can be implemented with a tape library, optical library, one or more independent hard disk drives, or multiple hard disk drives in a redundant array of independent disks (RAID). Similarly, data on database 175 may conform to any suitable storage architecture known in the art, such as a file, a relational database, an object-oriented database, and/or one or more tables. Database 175 may store data relating to training machine learning models, including unlabeled data, such as corpora of documents, labeled training sets, machine learning model data, and the like.

Figure 2:
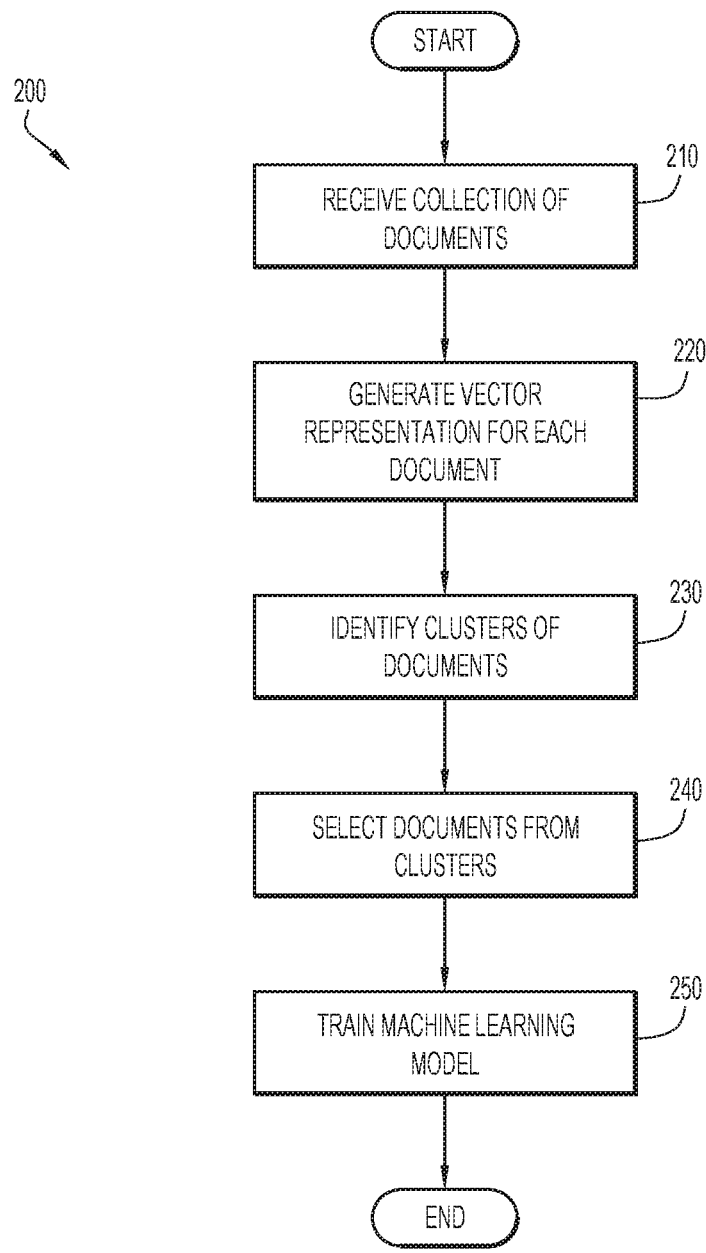
FIG. 2 is a flow chart depicting a method of training a machine learning model in accordance with an embodiment of the present invention.

FIG. 2 is a flow chart depicting a method 200 of training a machine learning model in accordance with an embodiment of the present invention.

A collection of documents is received at operation 210. The collection of documents may be provided to database 175 of model development server 145. The collection of documents may each contain text discussing one or more topics. Each document may thus represent a sample of text in a natural language. Each document may contain any length of text and may include any subject matter.

A vector representation for each document is generated at operation 220. Document processing module 155 may process a document to generate a vector representation that may describe the document's association with various topics. In some embodiments, a latent Dirichlet allocation model is applied to generate a vector representation for each document. A document's vector representation may include a series of scalar values that each represent the likelihood of the document relating to a particular topic. In some embodiments, a vector representation's scalar values range between zero and one, with a value of zero indicating a minimum association with a particular topic, and a value of one indicating a maximum association with a particular topic. A vector representation of a document may be an n-dimensional vector, wherein the dimensionality is defined according to a number of topics for which labeled samples are sought. In the absence of topic labels, the number of dimensions of each vector representation may correspond to the number of clusters that are identified in a group of vector representations. Additionally or alternatively, vector representations may be generated based on dictionaries that include keywords; for example, each vector representation may represent the appearance of words in a document that match keywords in dictionaries.

Clusters of documents are identified at operation 230. Clustering module 160 may identify clusters by analyzing the distribution of vector representations of documents in an n-dimensional space. Known or other clustering techniques may be employed, such as k-means clustering, to identify clusters of vector representations. In some embodiments, clustering module 160 may cluster documents in a manner that maximizes the distance between documents in each cluster and documents that are not in each cluster. Each cluster may correspond to a particular topic, which may be known based on the task and/or goal of a particular machine learning study. In some embodiments, a density function of the latent Dirichlet allocation model may be used to identify topics in a collection of documents based on the clusters formed by the vector representations of the documents.

Documents are selected from the clusters at operation 240. Selection module 165 may iteratively select documents for a training set by selecting one vector representation for each cluster in an iteration. The selection process may iterate until the training set has reached a predetermined size. Selection module 165 may perform each selection according to selection criteria, which may include selecting a document whose vector is closest to its cluster's centroid, selecting a document whose vector is farthest from its cluster's centroid, or selecting a document from a cluster at random. Selection module 165 may vary the selection criterion from one selection to another and/or from one iteration to another. In some embodiments, selection module 165 may order documents of a topic according to the distance of each document's vector representation from the topic, thereby generating a position vector for each document that is based on a position of the document in the order for a topic. Documents may then be selected for the training set according to the position vectors of the documents. A document that is selected for a training set may receive a label that indicates the topic of the cluster from which the document was selected.

A machine learning model is trained using the training set of selected documents at operation 250. Training module 170 may employ known or other training techniques, including supervised machine learning techniques, to train a machine learning model to map inputs to outputs based on examples found in the training set. Training module 170 may output a trained machine learning model to database 175.

Figure 3A:
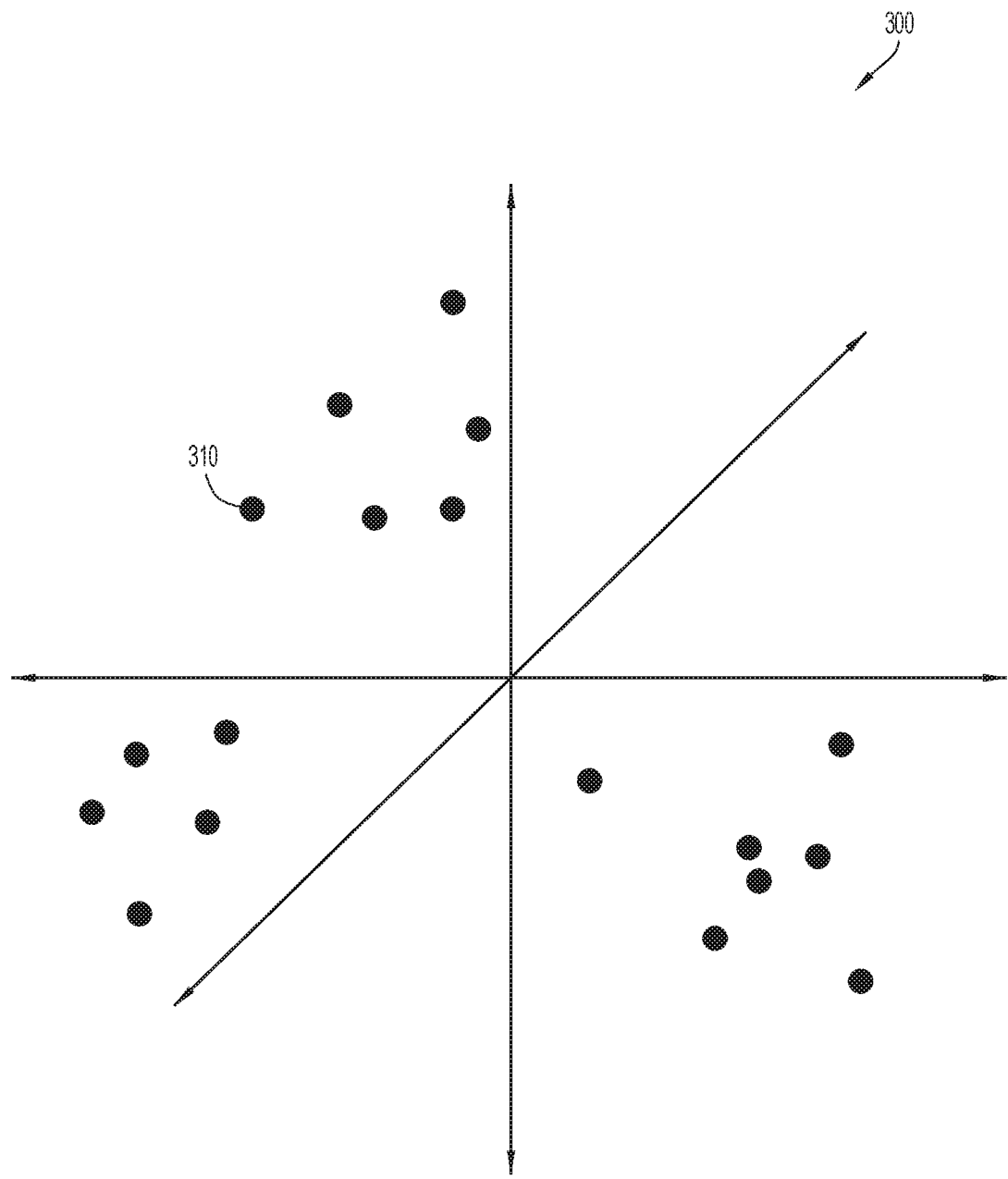
FIGS. 3A-3C are multidimensional spaces depicting vector representations of documents in accordance with an embodiment of the present invention.
Figure 3B:
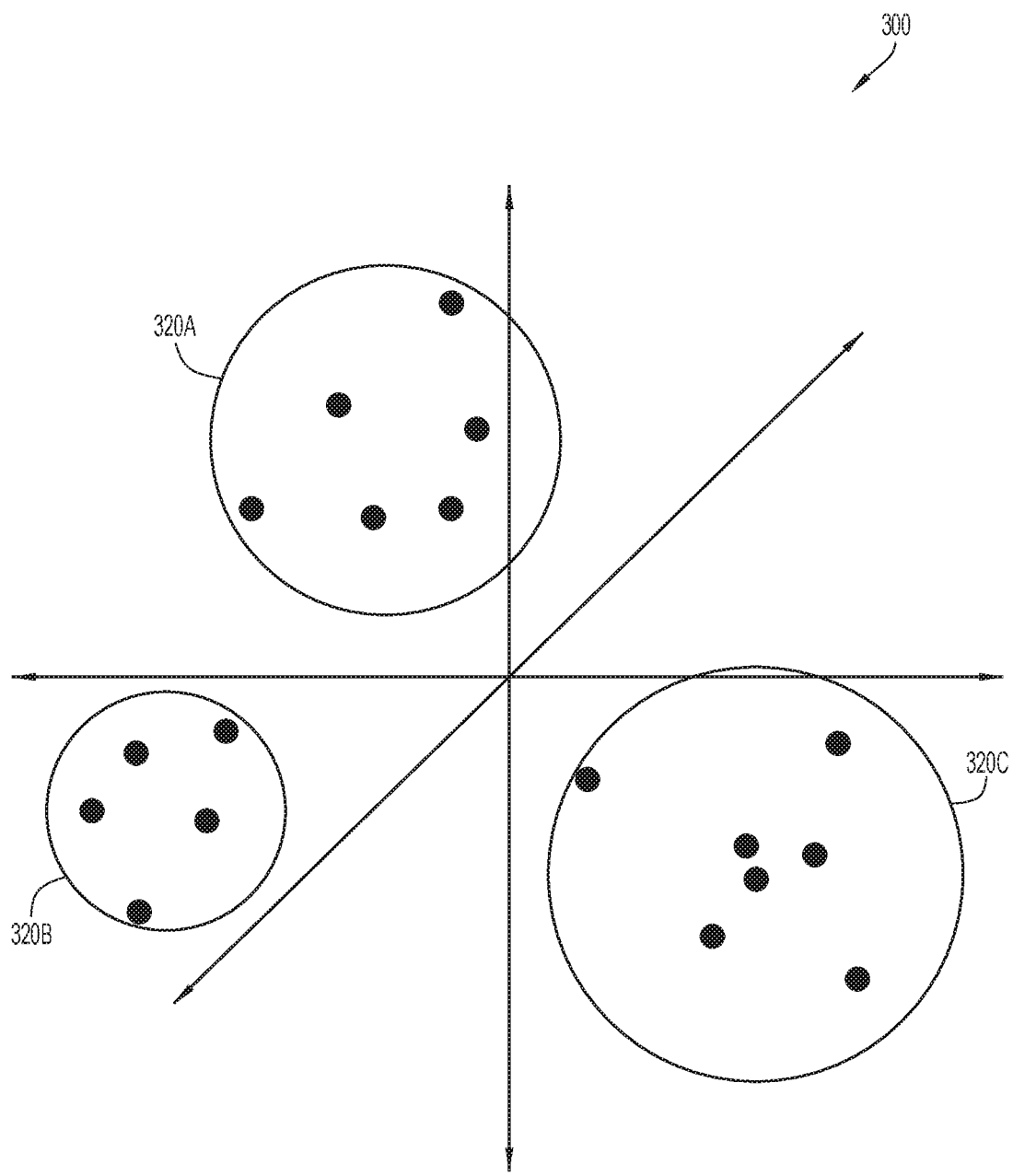
Figure 3C:
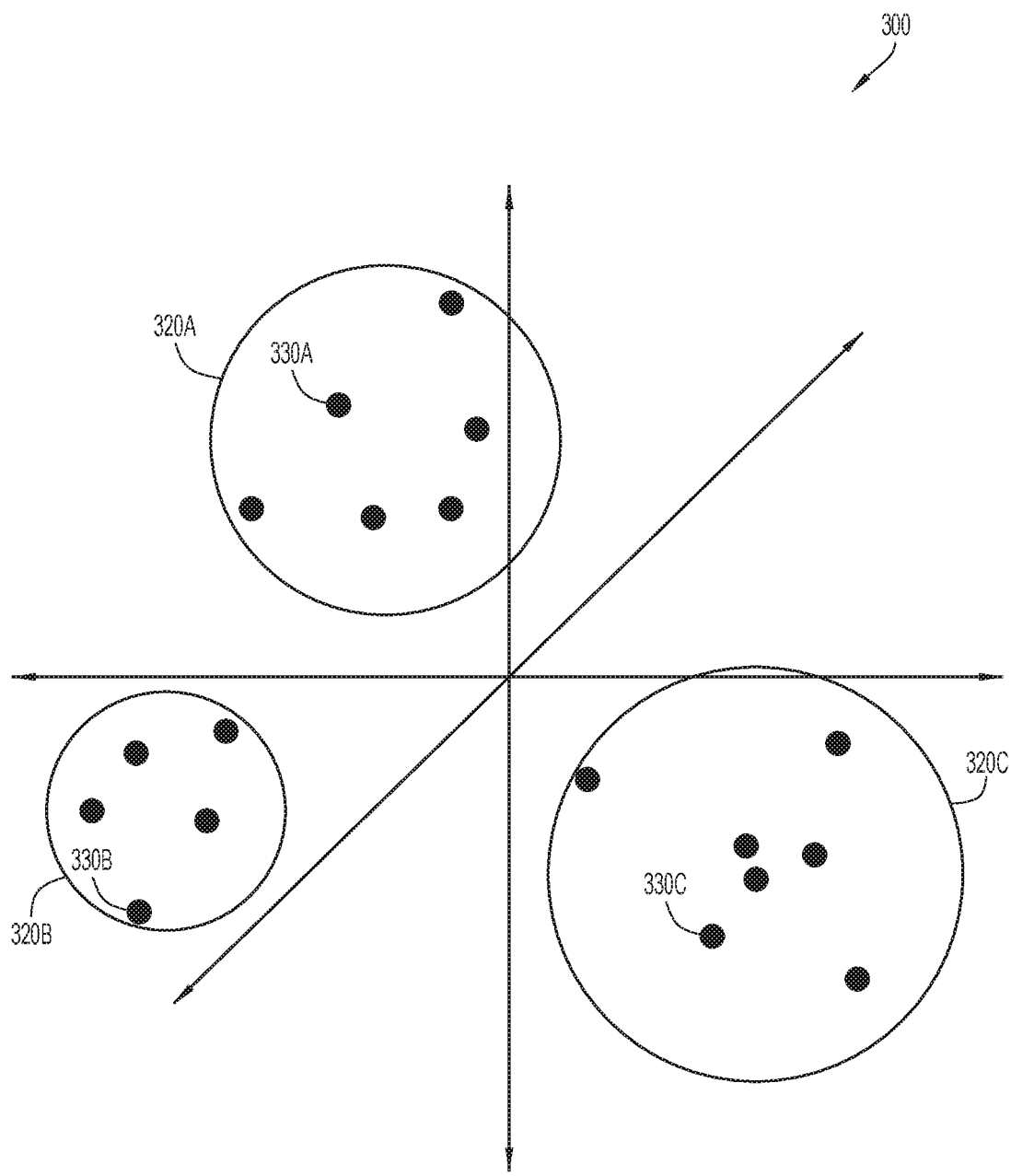

FIGS. 3A-3C are multidimensional spaces 300 depicting vector representations of documents in accordance with an embodiment of the present invention. The number of dimensions in multidimensional space 300, the number of vector representations, and the distribution of vector representations have been selected for the purpose of describing a present invention embodiment and should not be construed as a limiting example.

FIG. 3A depicts a multidimensional space 300 in which a plurality of vector representations are depicted. Each vector representation may be generated by processing a document according to embodiments presented herein. For example, document processing module 155 may process a document to generate vector representation 310. The placement of vector representations may correspond to the scalar values for each vector representation, which indicate the associations of documents to topics.

FIG. 3B depicts a multidimensional space 300 in which vector representations have been clustered into clusters 320A-320C. Clustering module 160 may identify three clusters of vector representations based on a known number of topics for a document collection or, in the absence of topic labels, based on the distribution of the vector representations.

FIG. 3C depicts a multidimensional space 300 in which a vector representation has been selected from each cluster. Selection module 165 may select vector representations from clusters based on selection criteria. For example, vector representation 330A may be selected from cluster 320A according to a selection criterion in a vector representation that is nearest to the centroid of a cluster is selected. Similarly, vector representation 330B may be selected from cluster 320B according to a selection criterion in which a vector representation farthest from a centroid of a cluster is selected. Vector representation 330C according to a selection criterion that instructs selection module 165 to select a vector representation at random from a cluster. In a next iteration, vector representations 330A-330C may be excluded from consideration, and selection module 165 may select other vector representations according to whichever selection criterion is employed.

Figure 4:
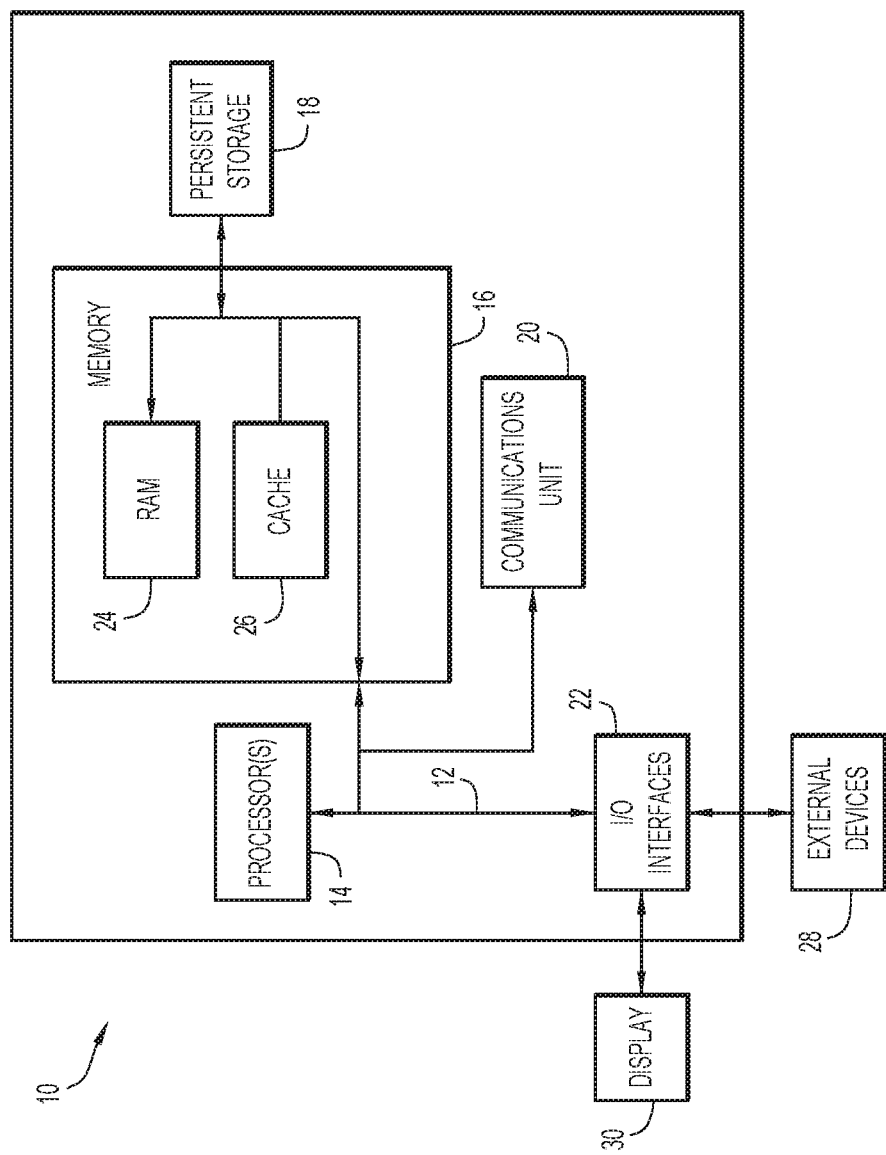
FIG. 4 is a block diagram depicting a computing device in accordance with an embodiment of the present invention.

FIG. 4 is a block diagram depicting components of a computer 10 suitable for executing the methods disclosed herein. Computer 10 may implement user devices 105 and/or model development server 145 in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to generating training sets to train machine learning models (e.g., unlabeled data, labeled training data, machine learning model data, topic data, dictionaries, etc.) may be stored within any conventional or other data structures (e.g., files, arrays, lists, stacks, queues, records, etc.) and may be stored in any desired storage unit (e.g., database, data or other repositories, queue, etc.). The data transmitted between user device 105 and model development server 145 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to generating training sets to train machine learning models (e.g., unlabeled data, labeled training data, machine learning model data, topic data, dictionaries, etc.) may include any information provided to, or generated by, user device 105 and/or model development server 145. Data relating to generating training sets to train machine learning models may include any desired format and arrangement, and may include any quantity of any types of fields of any size to store any desired data. The data relating to generating training sets to train machine learning models may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to generating training sets to train machine learning models), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of generating training sets to train machine learning models.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., server software, networking software, administration module 135, document processing module 155, clustering module 160, selection module 165, training module 170, etc.). These systems may include any types of monitors and input devices (e.g., keyboard, mouse, voice recognition, etc.) to enter and/or view information.

It is to be understood that the software (e.g., server software, networking software, administration module 135, document processing module 155, clustering module 160, selection module 165, training module 170, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., server software, networking software, administration module 135, document processing module 155, clustering module 160, selection module 165, training module 170, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to generating training sets to train machine learning models). The database system may be implemented by any number of any conventional or other databases, data stores or storage structures (e.g., files, databases, data structures, data or other repositories, etc.) to store information (e.g., data relating to generating training sets to train machine learning models). The database system may be included within or coupled to the server and/or client systems. The database systems and/or storage structures may be remote from or local to the computer or other processing systems, and may store any desired data (e.g., data relating to generating training sets to train machine learning models).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of training a machine learning model comprising:
   generating, via a processor, a vector representation for each document in a collection of documents, wherein the vector representation for each document is generated by applying a latent Dirichlet allocation model that determines topics for each document, wherein the documents of each topic are ordered based on a distance of the document to that topic, and wherein a position vector is generated for each document based on a position of the document in the order for each topic;
   clustering, via the processor, the documents based on the vector representations of the documents to produce a plurality of clusters;
   producing, via the processor, a training set by selecting one or more documents from each cluster based on the position vectors of the one or more documents, wherein the selected documents represent a sample of the collection of documents to train the machine learning model; and
   training the machine learning model, via the processor, by applying the training set to the machine learning model.

2. The computer-implemented method of claim 1, wherein selecting the one or more documents from each cluster further comprises:
   selecting the one or more documents from each cluster over a plurality of iterations based on selection criteria, wherein the selection criteria for each iteration include one of closest to a centroid, farthest from the centroid, and a random selection.

3. The computer-implemented method of claim 1, wherein the vector representation for each document indicates associations of the document to corresponding topics.

4. The computer-implemented method of claim 1, wherein the vector representation for each document is generated based on dictionaries with keywords, and wherein the vector representation for each document indicates terms of the document in the dictionaries.

5. The computer-implemented method of claim 1, wherein the topics are determined
   by applying a density function of the latent Dirichlet allocation model.

6. The computer-implemented method of claim 3, further comprising:
  labelling the selected documents with a corresponding topic based on the indicated associations to corresponding topics in response to an absence of topic labels for the selected documents.

7. A computer system for training a machine learning model, the computer system comprising:
  one or more computer processors;
  one or more computer readable storage media;
  program instructions stored on the one or more computer readable storage media for execution by at least one of the one or more computer processors, the program instructions comprising instructions to:
  generate a vector representation for each document in a collection of documents, wherein the vector representation for each document is generated by applying a latent Dirichlet allocation model that determines topics for each document, wherein the documents of each topic are ordered based on a distance of the document to that topic, and wherein a position vector is generated for each document based on a position of the document in the order for each topic;
  cluster the documents based on the vector representations of the documents to produce a plurality of clusters;
  produce a training set by selecting one or more documents from each cluster based on the position vectors of the one or more documents, wherein the selected documents represent a sample of the collection of documents to train the machine learning model; and
  train the machine learning model by applying the training set to the machine learning model.

8. The computer system of claim 7, wherein the program instructions to select the one or more documents from each cluster further comprise instructions to:
  select the one or more documents from each cluster over a plurality of iterations based on selection criteria, wherein the selection criteria for each iteration include one of closest to a centroid, farthest from the centroid, and a random selection.

9. The computer system of claim 7, wherein the vector representation for each document indicates associations of the document to corresponding topics.

10. The computer system of claim 7, wherein the vector representation for each document is generated based on dictionaries with keywords, and wherein the vector representation for each document indicates terms of the document in the dictionaries.

11. The computer system of claim 7, wherein the topics are determined
  by applying a density function of the latent Dirichlet allocation model.

12. The computer system of claim 9, further comprising instructions to:
  label the selected documents with a corresponding topic based on the indicated associations to corresponding topics in response to an absence of topic labels for the selected documents.

13. A computer program product for training a machine learning model, the computer program product comprising one or more computer readable storage media collectively having program instructions embodied therewith, the program instructions executable by a computer to cause the computer to:
  generate a vector representation for each document in a collection of documents, wherein the vector representation for each document is generated by applying a latent Dirichlet allocation model that determines topics for each document, wherein the documents of each topic are ordered based on a distance of the document to that topic, and wherein a position vector is generated for each document based on a position of the document in the order for each topic;
  cluster the documents based on the vector representations of the documents to produce a plurality of clusters;
  produce a training set by selecting one or more documents from each cluster based on the position vectors of the one or more documents, wherein the selected documents represent a sample of the collection of documents to train the machine learning model; and
  train the machine learning model by applying the training set to the machine learning model.

14. The computer program product of claim 13, wherein the program instructions to select the one or more documents from each cluster further comprise instructions to:
  select the one or more documents from each cluster over a plurality of iterations based on selection criteria, wherein the selection criteria for each iteration include one of closest to a centroid, farthest from the centroid, and a random selection.

15. The computer program product of claim 13, wherein the vector representation for each document indicates associations of the document to corresponding topics.

16. The computer program product of claim 13, wherein the vector representation for each document is generated based on dictionaries with keywords, and wherein the vector representation for each document indicates terms of the document in the dictionaries.

17. The computer program product of claim 13, wherein the topics are determined
  by applying a density function of the latent Dirichlet allocation model.

18. The computer program product of claim 15, further comprising instructions to:
  label the selected documents with a corresponding topic based on the indicated associations to corresponding topics in response to an absence of topic labels for the selected documents.

* * * * *